(12) United States Patent
Lenchner et al.

(10) Patent No.: US 10,048,934 B2
(45) Date of Patent: *Aug. 14, 2018

(54) LEARNING INTENDED USER ACTIONS

(71) Applicant: INTERNATIONAL BUSINESS MACHINES CORPORATION, Armonk, NY (US)

(72) Inventors: Jonathan Lenchner, North Salem, NY (US); Vinay Venkataraman, Tempe, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 14/623,233

(22) Filed: Feb. 16, 2015

(65) Prior Publication Data
US 2016/0239258 A1 Aug. 18, 2016

(51) Int. Cl.
*G10L 21/00* (2013.01)
*G06F 3/16* (2006.01)
(Continued)

(52) U.S. Cl.
CPC .............. *G06F 3/167* (2013.01); *G06F 3/005* (2013.01); *G06F 3/017* (2013.01); *G10L 15/04* (2013.01);
(Continued)

(58) Field of Classification Search
CPC ....................................................... G10L 17/00
(Continued)

(56) References Cited

U.S. PATENT DOCUMENTS 5,502,774 A    3/1996  Bellegarda et al.
5,796,926 A *  8/1998  Huffman ............... G06N 99/005
                                                    706/45

(Continued)

FOREIGN PATENT DOCUMENTS

EP          1557822 A1    7/2005

OTHER PUBLICATIONS

Bolt, R. "'Put-That-There': Voice and Gesture at the Graphics Interface" SIGGRAPH '80 Proceedings of the 7th annual conference on Computer graphics and interactive techniques. 1980. pp. 262-270.

(Continued)

*Primary Examiner* — Michael Colucci
(74) *Attorney, Agent, or Firm* — Tutunjian & Bitetto, P.C.; Rahan Uddin

(57) ABSTRACT

A method and system are provided. The method includes receiving, by a microphone and camera, user utterances indicative of user commands and associated user gestures for the user utterances. The method further includes parsing, by a hardware-based recognizer, sample utterances and the user utterances into verb parts and noun parts. The method also includes recognizing, by a hardware-based recognizer, the user utterances and the associated user gestures based on the sample utterances and descriptions of associated supporting gestures for the sample utterances. The recognizing step includes comparing the verb parts and the noun parts from the user utterances individually and as pairs to the verb parts and the noun parts of the sample utterances. The method additionally includes selectively performing a given one of the user commands responsive to a recognition result.

10 Claims, 7 Drawing Sheets

(51) Int. Cl.
*G10L 15/22* (2006.01)
*G10L 15/18* (2013.01)
*G06F 3/01* (2006.01)
*G06F 3/00* (2006.01)
*G10L 15/04* (2013.01)
*G10L 15/26* (2006.01)
*G10L 15/24* (2013.01)

(52) U.S. Cl.
CPC .......... *G10L 15/1822* (2013.01); *G10L 15/22* (2013.01); *G10L 15/265* (2013.01); *G10L 15/24* (2013.01); *G10L 2015/227* (2013.01)

(58) Field of Classification Search
USPC ............ 704/275, 249, 769, 9, 235; 707/769; 715/728
See application file for complete search history.

(56) References Cited

U.S. PATENT DOCUMENTS

| | | | | |
|---|---|---|---|---|
| 6,570,588 | B1* | 5/2003 | Ando | G06F 3/0481 715/728 |
| 7,409,381 | B1* | 8/2008 | Steel | G06F 17/30616 704/1 |
| 7,765,097 | B1* | 7/2010 | Yu | G06F 17/243 704/9 |
| 8,103,502 | B1* | 1/2012 | Bangalore | G06K 9/00355 704/243 |
| 8,272,874 | B2 | 9/2012 | Julia et al. | |
| 8,473,292 | B2 | 6/2013 | Williams et al. | |
| 8,626,507 | B2 | 1/2014 | Bangalore et al. | |
| 8,706,503 | B2* | 4/2014 | Cheyer | G06F 17/3087 704/275 |
| 8,738,377 | B2 | 5/2014 | Byrne et al. | |
| 8,756,508 | B2 | 6/2014 | Ohki et al. | |
| 8,849,661 | B2* | 9/2014 | Tanioka | G06F 3/0486 704/235 |
| 8,849,670 | B2 | 9/2014 | Di Cristo et al. | |
| 2010/0281435 | A1 | 11/2010 | Bangalore et al. | |
| 2011/0055256 | A1* | 3/2011 | Phillips | G10L 15/30 707/769 |
| 2011/0161347 | A1* | 6/2011 | Johnston | G06F 17/30914 707/769 |
| 2013/0080898 | A1* | 3/2013 | Lavian | G06F 3/16 715/728 |
| 2014/0324429 | A1 | 10/2014 | Weilhammer et al. | |
| 2015/0046418 | A1* | 2/2015 | Akbacak | G06F 17/3002 707/706 |
| 2016/0140955 | A1* | 5/2016 | Connell, II | G06F 3/017 704/235 |
| 2016/0171980 | A1* | 6/2016 | Liddell | G10L 15/22 704/275 |

OTHER PUBLICATIONS

Oviatt, S., et al. "Multimodal Interfaces That Process What Comes Naturally" Communications of the ACM. vol. 43, No. 3. Mar. 2000. pp. 45-53.

Schmandt, C. "Some Applications of Three-Dimensional Input" Computer Science Thesis paper, Massachusetts Institute of Technology. Jan. 1980. pp. 1-36.

Wu, Y., et al. "Vision-Based Gesture Recognition: A Review" Gesture-Based Communication in Human-Computer Interaction Lecture Notes in Computer Science. vol. 1739. 1999. pp. 103-115.

* cited by examiner

LEARNING INTENDED USER ACTIONS

BACKGROUND

Technical Field

The present invention relates generally to information processing and, in particular, to the fields of speech and gesture recognition.

Description of the Related Art

Work involving resolving anaphora (where, as used herein, anaphora refers to pronouns) in a multimodal environment is rule-based and does not employ learning. Accordingly, such prior art is therefore static and brittle. That is, such prior art is brittle in the sense that voice transcription applied to terse assertions is generally of very poor quality and, hence, rules that depend in part on accurate or near-accurate transcription of words can be failure prone. Thus, there is a need for a more dynamic and non-ruled based approach to multimodal command recognition capable of learning and resolving anaphora.

SUMMARY

According to an aspect of the present principles, a method is provided. The method includes receiving, by a microphone and camera, user utterances indicative of user commands and associated user gestures for the user utterances. The method further includes parsing, by a hardware-based recognizer, sample utterances and the user utterances into verb parts and noun parts. The method also includes recognizing, by a hardware-based recognizer, the user utterances and the associated user gestures based on the sample utterances and descriptions of associated supporting gestures for the sample utterances. The recognizing step includes comparing the verb parts and the noun parts from the user utterances individually and as pairs to the verb parts and the noun parts of the sample utterances. The method additionally includes selectively performing a given one of the user commands responsive to a recognition result.

According to another aspect of the present principles, a system is provided. The system includes a microphone and camera for receiving user utterances indicative of user commands and associated user gestures for the user utterances. The system further includes a hardware-based recognizer for parsing sample utterances and the user utterances into verb parts and noun parts, and recognizing the user utterances and the associated user gestures based on the sample utterances and descriptions of associated supporting gestures for the sample utterance by comparing the verb parts and the noun parts from the user utterances individually and as pairs to the verb parts and the noun parts of the sample utterances. The system also includes a user command selective execution device for selectively performing a given one of the user commands responsive to a recognition result.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to learning intended user actions. Embodiments of the present principles learn intended user actions utilizing speech and gesture recognition.

In an embodiment, the present principles involve interactive machine learning (also known in the literature as online machine learning) of multimodal commands. In an embodiment, the present principles can be implemented as a system or method for spoken language and gestural recognition. The user can make gestures and/or issue speech commands in front of a gesture recognition device to execute a command. At the trigger of the command by a user, the system and method can provide real time feedback. Each natural language command can be broken down into a verb and noun and the system can learn to associate the action with the verb and the noun separately in combination with the gesture or together combined with the gesture. Furthermore, the system and method can learn new ways of articulating and gesticulating intent though positive (i.e., user accepted) and negative (i.e., user rejected) examples.

Advantageously, the present principles can be applied to many situations not capable of being addressed in an acceptable manner, if at all, by the prior art. For example, in an embodiment, the present principles can overcome the following problem: a user intends that a desired action be carried out by a computer system and/or other processor-enabled device in response to using a combination of speech and gestural actions, but because of the very terse typical utterance and use of anaphora (pronouns), it is not easy for the computer system and/or device to accurately transcribe the spoken words and thereby understand the intended behavior of the user. Embodiments of the present principles can readily provide the computer system with the capability to process anaphora in such a situation. These and other advantages of the present principles as well as situations to which the present principles can be applied are readily determined by one of ordinary skill in the art, given the teachings of the present principles provided herein, while maintaining the spirit of the present principles.

Moreover, the present principles are advantageously adept at processing deixis (deixis herein refers to words and phrases that cannot be fully understood without additional spatial and/or contextual information). As such, phrases that can be difficult to understand without additional spatial and/or contextual information can be readily processed in accordance with the present principles.

Further, while one or more embodiments are directed to pointing as a gesture to which the present principles are applied, the present principles are not limited to solely pointing and, thus, other gestures (for example flicking, pushing or pulling gestures) can also be used in accordance with the teachings of the present principles, while maintaining the spirit of the present principles.

Figure 1:
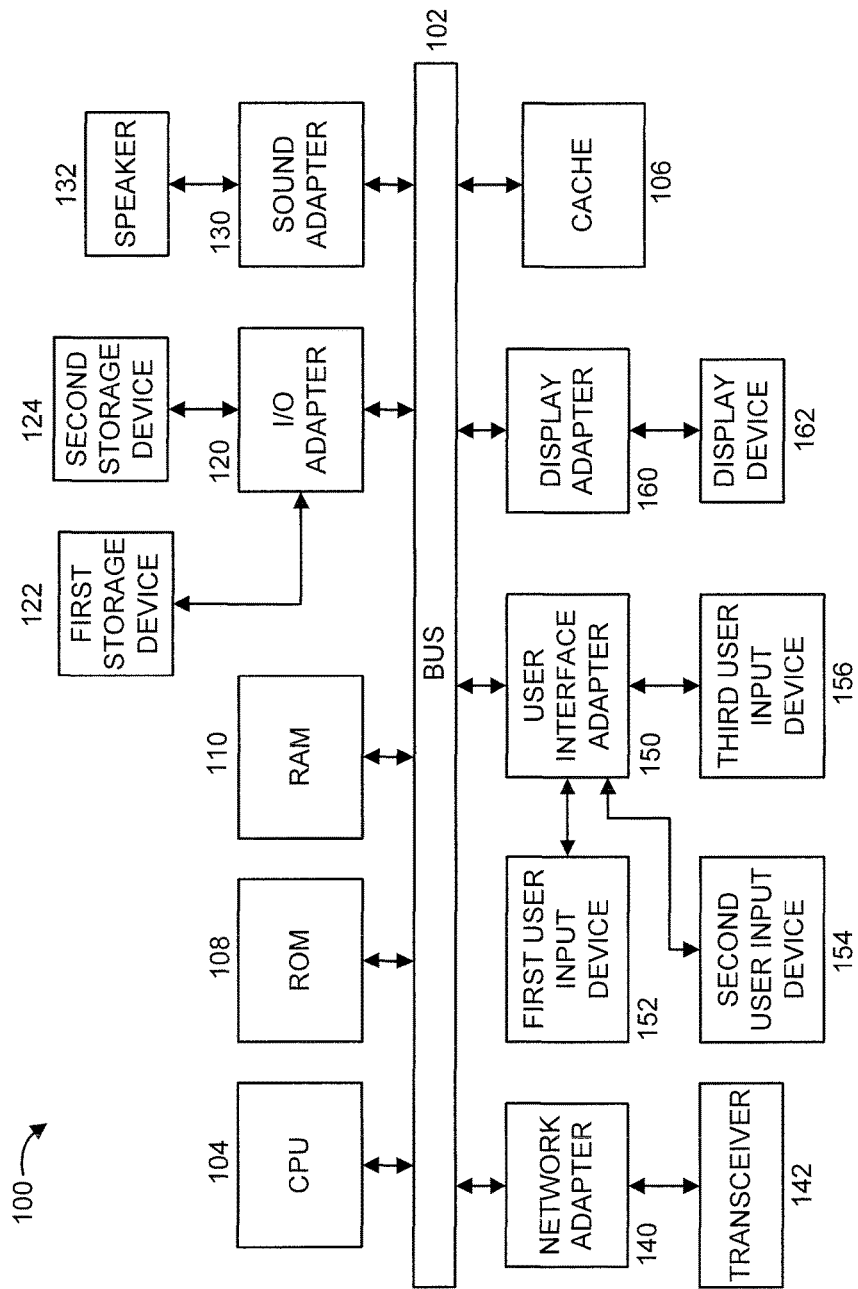
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
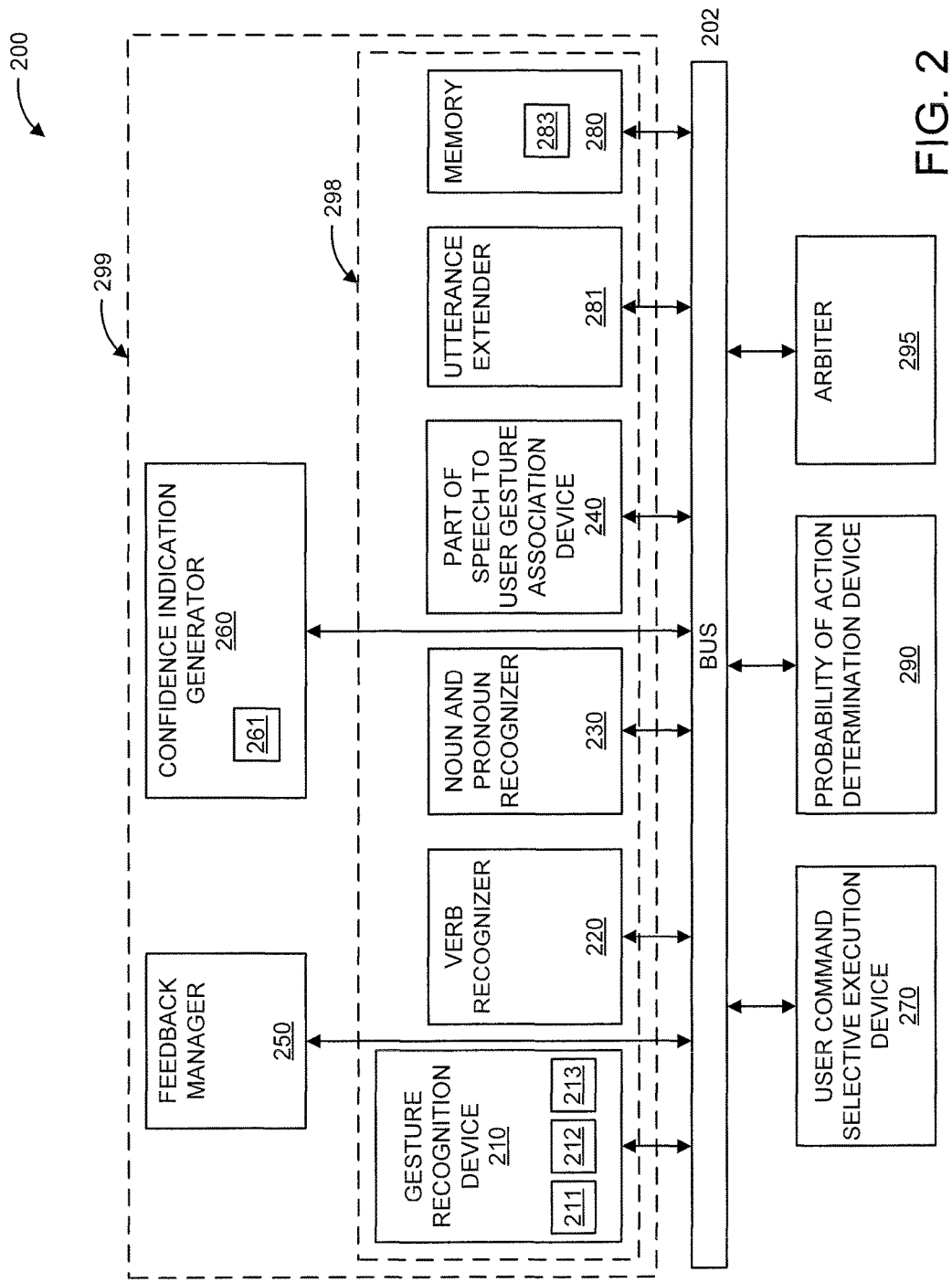
FIG. 2 shows an exemplary system 200 for learning intended user actions utilizing speech and gesture recognition, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
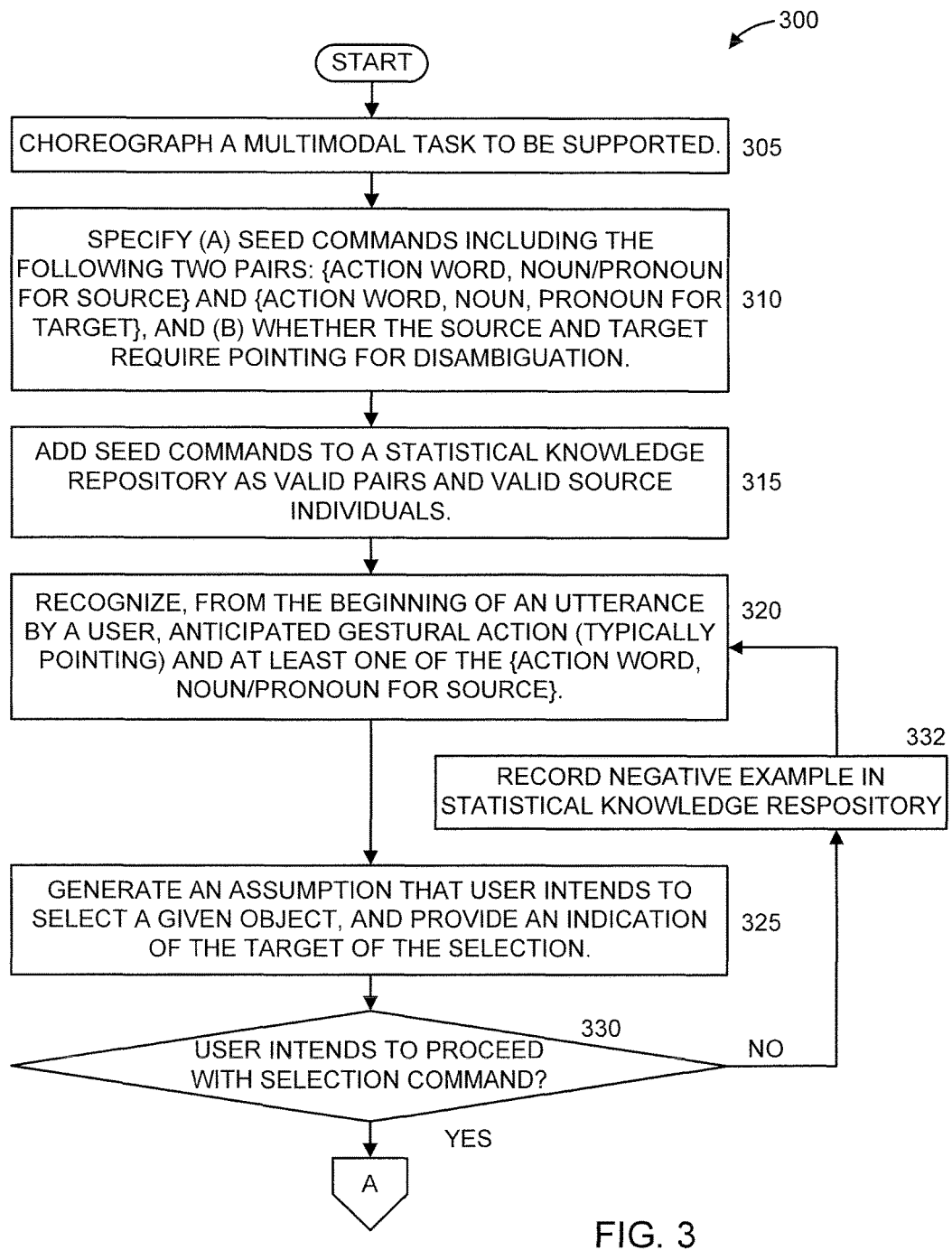
FIGS. 3-4 show an exemplary method 300 for learning intended user actions utilizing speech and gesture recognition, in accordance with an embodiment of the present principles.
Figure 4:
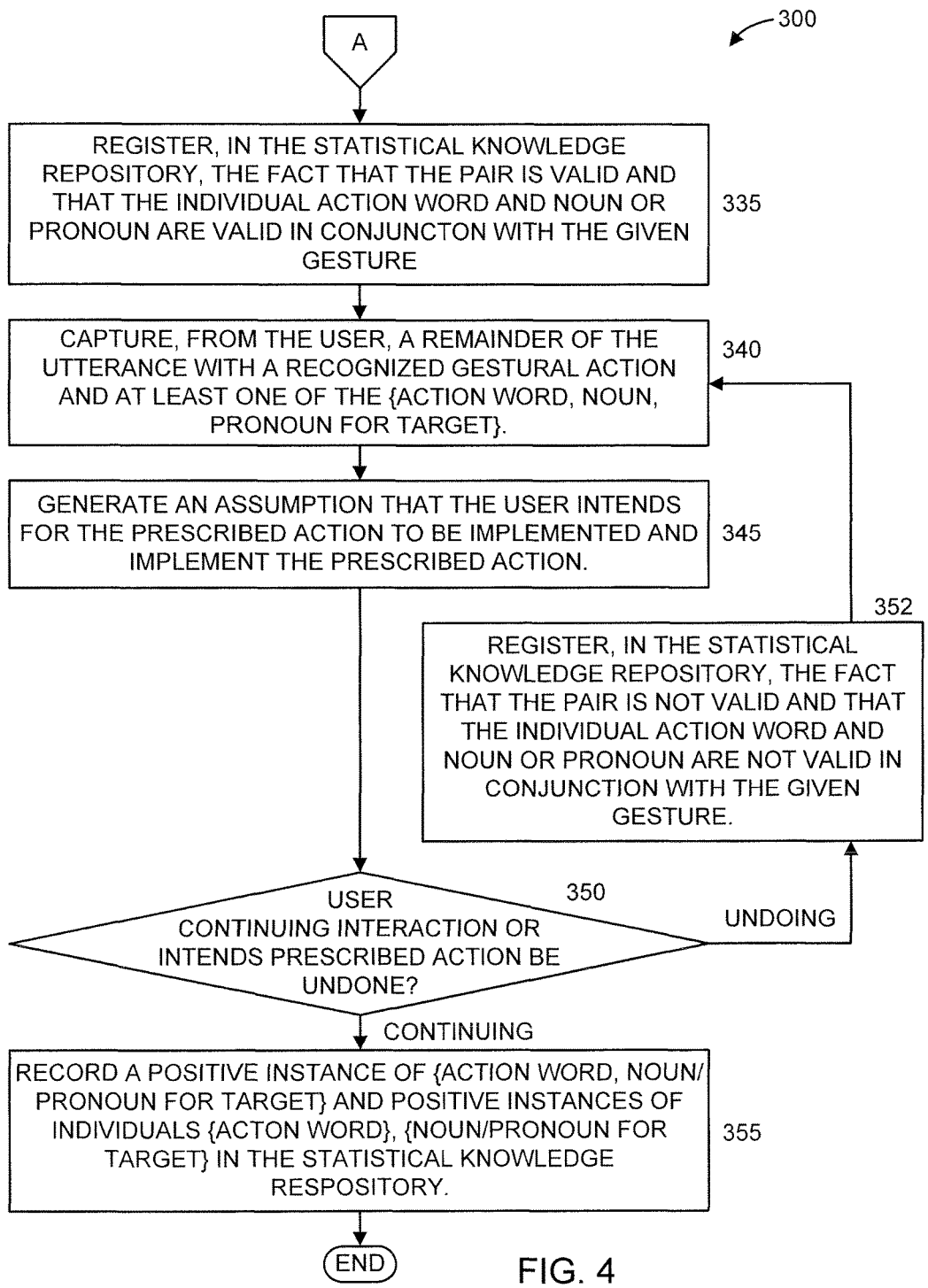

Further, it is to be appreciated that processing system 100 may perform at least part of the method described herein including, for example, at least part of method 300 of FIGS. 3-4. Similarly, part or all of system 200 may be used to perform at least part of method 300 of FIGS. 3-4.

FIG. 2 shows an exemplary system 200 for learning intended user actions utilizing speech and gesture recognition, in accordance with an embodiment of the present principles. The system 200 includes a gesture recognition device 210, a verb (action word) recognizer 220, a noun and pronoun recognizer 230, a part of speech to user gesture association device 240, a feedback generator 250, a confidence indication generator 260, a user command selective execution device 270, a memory device 280, an utterance extender 281, a probability of action determination device 290, and an arbiter 295. The gesture recognition device 210, the verb recognizer 220, the noun and pronoun recognizer 230, the utterance extender 281, the part of speech to user gesture association device 240, and the memory device 280 form a user speech and associated gesture recognizer 298. The user speech and associated gesture recognizer 299, the feedback generator 250, and the confidence indication generator 260 form a user command learning device 299.

The gesture recognition device 210 recognizes actions and/or gestures (hereinafter "gestures") performed by a user. In an embodiment, the gesture recognition device 210 includes a motion capture device 211, a gesture database 212, and a user gesture to stored gesture comparison device 213. In an embodiment, the motion capture device 211 can include a camera, a camcorder, or any other type of image capture device. While described as a motion capture device, element 211 can be any type of device capable of capturing a user gesture, including static gestures where no or minimal movement is performed by the user. In an embodiment, the gesture database 212 stores expected user gestures and can be supplemented by new (e.g., previously unstored) gestures as they are captured and used by system 200. The user gesture to stored gesture comparison device 213 compares contemporaneously performed user gestures to gestures in the gesture database 212 in order to recognize the contemporaneously performed user gestures. In an embodiment, the user gesture to stored gesture comparison device 213 can provide an output indicative of a particular recognized gesture (e.g., an output indicative of the user pointing and where the user is pointing [akin to a mouse pointer], and so forth).

The verb recognizer 220 recognizes verbs from utterances spoken by the user.

The noun and pronoun recognizer 230 recognizes nouns and pronouns from utterances spoken by a user.

The part of speech to user gesture association device 240 associates parts of speech (e.g., verbs, nouns, and pronouns) to user gestures.

The feedback manager 250 records and/or manages feedback (also referred to herein as evidence) relating to whether a pair of {action word, noun/pronoun} together with an associated gesture indicates that a user expects a particular system response and/or relating to whether any one of the {action word or noun/pronoun} together with an associated gesture indicates that a user expects a particular system response.

A confidence indication generator 260 generates confidence indications (which can take any form, including a score) relating to whether a pair of {action word, noun/pronoun} together with an associated gesture indicates that a user expects a particular system response and/or relating to whether any one of the {action word or noun/pronoun} together with an associated gesture indicates that a user expects a particular system response. In an embodiment, the confidence indication generator 260 can include an error indication generator 261 that represents a degree of error or uncertainty in the system's confidence that a pair of {action word, noun/pronoun} together with an associated gesture are indicative of a particular system response and/or a degree of error or uncertainly in the system's confidence that any of the {action word or noun/pronoun} together with an associated gesture are indicative of a particular system response. In an embodiment, one or more of the confidence indications and the error indications can be used. In an embodiment, one or both of the confidence indications and the error indications can be determined responsive to the feedback recorded and/or managed by the feedback manager 250. In an embodiment, the confidence indications and/or the error indications can be generated responsive to a predetermined number of times that a pair of {action word, noun/pronoun} and/or any one of the {action word or noun/pronoun} are deemed to be successfully implemented (i.e., in response to the user's request to take an action, the system responds and the user does not immediately attempt to undo the action).

The user command selective execution device 270 selectively executes user requests for system response. The selectivity of execution of these system responses can depend on one or more criteria. Such criteria include, but are not limited to, evidence (e.g., supporting evidence, contrary evidence), user intent (e.g., as represented by affirmance/allowance of an action by a user or a request to undo an action by the user), and so forth. In an embodiment, the evidence can include feedback and/or confidence indications and/or error indications.

The memory device 280 stores evidence for particular combinations of action words potentially spoken in combination with a noun/pronoun in the presence of a recognized user gesture. In an embodiment, the memory device 280 stores "seed expressions" that may accompany a given gesture (e.g., the gestures stored in the gesture database 212) that are indicative of particular, expected, system responses. These seed expressions can be used to build up an ever increasing lexicon through positive and negative examples as indicated through evidence (e.g., feedback, confidence indications, and/or error indications). In an embodiment, the memory device 280 can include a statistical knowledge repository 283 that keeps track of words and phrases used in conjunction with recognized gestures, and how often each of these lead to accepted system actions versus system actions which are rejected via an undo request.

The utterance extender 281 can extend sample utterances (e.g., seed expressions) prior to or in parallel with training. Such extensions can be based on synonyms, common known mistranscriptions of either the sample utterances or their synonyms, or mistranscriptions that are witnessed by the system. Of course, other ways of extension can also be used, while maintaining the spirit of the present principles.

The probability of action determination device 290 makes a determination, given a combination of words and gesture, the respective probabilities or likelihoods that particular system actions have been requested.

The multiple action arbiter 295 arbitrates between the multiple system actions when two or more are deemed to be applicable at a given time for a given session with a user. The arbiter can then pick one from among several of the multiple actions and, in an embodiment, can pick two or more, but less than all or even up to all, of the actions as they are deemed applicable. The determination of applicability can be based on the feedback and/or the confidence indications and/or the error indications.

In the embodiment shown in FIG. 2, the elements thereof are interconnected by a bus 201. However, in other embodiments, other types of connections can also be used. Moreover, in an embodiment, at least one of the elements of system 200 is processor-based. Further, while the feedback generator 250 and confidence indication generator 260 are shown as separate elements, in other embodiments, these elements can be combined as one element. The converse is also applicable, where an element included in another element in FIG. 2 can be implemented as a separate element in another embodiment. These and other variations of the elements of system 200 are readily determined by one of ordinary skill in the art, given the teachings of the present principles provided herein, while maintaining the spirit of the present principles.

FIGS. 3-4 show a method 300 for learning intended user actions utilizing speech and gesture recognition, in accordance with an embodiment of the present principles.

At step 305, choreograph a multimodal task to be supported.

At step 310, specify (A) seed commands including the following two pairs: {action word, noun/pronoun for source} and {action word, noun, pronoun for target}, and (B) whether the source and target require pointing for disambiguation. Typically if a pronoun is used pointing is required for disambiguation of that pronoun.

At step 315, add seed commands to a statistical knowledge repository 283 as valid source pairs and valid source individuals. The statistical knowledge repository 283 will keep track of words and word pairs used in conjunction with recognized gestures, and how often each of these lead to accepted system actions versus system actions which are then rejected via an undo request.

At step 320, recognize, from the beginning of an utterance by a user, the anticipated gestural action (typically pointing) and at least one of the {action word, noun/pronoun for source}. This step is the selection phase of the command. A prototypical example is a user utterance of the form "Take this" while the user points to whatever "this" refers to. In this case, the action word is "Take", the pronoun for the source is "this" and the anticipated gestural action is pointing.

At step 325, generate an assumption that the user intends to select a given object (that is, issue a selection command), and provide an indication of the target of the selection (e.g., by highlighting the given object on a screen).

At step 330, determine whether or not the user intends to proceed with the selection command. If so, then the method proceeds to step 335. Otherwise, for example, if the user asks to undo the command, the method proceeds to step 332 to record the negative example in the statistical knowledge repository 283, and returns to step 320.

At step 335, register, in the statistical knowledge repository 383, the fact that the pair is valid and that the individual action word and noun or pronoun are valid in conjunction with the given gesture.

At step 340, capture, from the user, a remainder of the utterance with a recognized gestural action (typically pointing) and at least one of the {action word, noun/pronoun for target}.

At step 345, generate an assumption that the user intends for the prescribed action to be implemented and implement the prescribed action.

At step 350, determine whether or not the user is continuing with the interaction (e.g., making further utterances, gesturing, interacting with others) or intends that the prescribed action be undone. If the user is continuing with the interaction, the method proceeds to step 355. Otherwise, if the user intends that the prescribed action be undone the method continues to step 352 wherein the statistical knowledge repository registers the fact that the pair is not valid and that the individual action word and noun or pronoun are not valid in conjunction with the given gesture, and then the method returns to step 340.

At step 355, record a positive instance of {action word, noun/pronoun for target} and positive instances of individuals {action word}, {noun/pronoun for target} in the statistical knowledge repository 383.

Our solution learns the different ways in which the desire for a given action, or system response, can be expressed, starting with one or more "seed expressions" for this action or system response, building up an ever-expanding lexicon through both positive and negative examples. In an embodiment, we exploit the following: the utterance behind any supported gestural action necessarily has two parts. For example, the expression "take this and put it there" has the two parts (1) "take this" and (2) "[and] put it there", where one first points to whatever "this" is, and then points to whatever "that" is. At each juncture, the system gives feedback that it has understood what the user intends. Thus, if the "this" in the clause "take this" is an image on one screen, the moment "take this" is uttered with an accompanying gesture, the system highlights "this" to indicate its understanding of this and also that the user wishes to select "this" and do something with it. Following the expression "take this", when the user points in the direction of "there" a mouse-like cursor appears on the surface to which the user is pointing to give feedback. Only when the user is sure the system understands where the user is pointing is the user expected to lock in on the expression "and move it there", at which point the image originally in the "this" location is moved to the "there" location. In each segment of the utterance, the system looks for the user to employ an action word (verb) that the system recognizes and either a pronoun or noun that the system recognizes. If only one of the two (action word, or noun/pronoun) is present, then the system will still execute the action unless the system has accumulated evidence to the contrary, i.e., that the single action word or single noun does not generally indicate an intent to select the thing being pointed at. The user is always presented with an undo option, by saying a phrase like "no" or "no, I didn't mean that" or any word or words that convey the same concept of wanting to undo something. If the user is satisfied with the move, then the system learns a positive instance of the given new action word or noun/pronoun. If the user is unsatisfied, then a negative instance is credited to the given new action word or noun/pronoun. If a noun/pronoun or action word is successful a majority of the time, it is assumed to be valid with some confidence and error bars. The greater the error bars, the less the system will trust its conclusion, and especially in the case where an action word, noun/pronoun pair is deemed to only marginally be negatively indicative of an intent to select something. In an embodiment, addition probing will be done in an effort to narrow the error bars (in an exploration versus exploitation fashion).

In an embodiment, there can be probabilistic extensions to the present principles in the case that an implementation (e.g., system, method, and so forth) of the present principles is actively listening for multiple actions. For example, the system may be listening for the possibility that the user wants to move something to a new screen or alternatively add something to a shopping basket, or to a table of some sort for further analysis. In an embodiment, different and multiple listeners can be enabled at any given time as applicable or intended. The listener behind each action will have its own probability of acting, with each trading off exploration versus exploitation in bandit-like fashion. For example, the listener listening for the possibility that the user wants to move a selected item to a secondary screen may have X % confidence that the last utterance and accompanying gesture was indicative of this action, while the listener listening for something to be added to the shopping cart may have Y % confidence that the last utterance was indicative of this action, and the listener listening for something to be added to a given table may have Z % confidence. Each listener learns something by being wrong, with the least used listeners generally standing to gain the most. Thus, with some probability, each listener will opt to act, even when their assessment of their probability of being correct in their action is less than 50%. If several listeners decide to act there will be an arbitration. Each submits a confidence in its action and the one with highest confidence will be given the chance to act (assuming the actions are mutually exclusive, e.g. a move request and a delete request). In an embodiment, multiple and different listeners can be implemented by different and multiple threads, processes and/or devices being executed or being used concurrently in order to recognize and process the multiple actions.

In addition to seeding the system with sample utterances, the system may use various means of extending the sample utterances prior to or in parallel with training.

Consider the utterance "Select this and move it there". The system breaks this utterance into two pieces: (i) "Select this," and (ii) "move it there," the former being what we call the selection directive, and the latter the move directive. The in-between word "and" is ignored. In an embodiment, up to two filler words of this sort are allowed. Each of these directives is deemed to be completed when the user is pointing and either a deictic is heard or a verb is heard (but no deictic) and a pause in speech occurs of at least 0.25 seconds. To estimate the probability, $p_{accept}$, that the user actually means to select something, under the assumption that the system believes the user to be pointing at something that is selectable, in a sample embodiment the system uses the following formula:

$$p_{accept} = \frac{p_v + p_p + \frac{|v,p|}{2} p_{v,p}}{2 + \frac{|v,p|}{2}} \quad (1)$$

where: $p_v$=probability of acceptance of the utterance given that the system has seen the verb; $p_p$=probability of acceptance of the utterance given that the system has seen the pronoun; $p_{v,p}$=probability of acceptance of the utterance given that the system has seen both the verb and the pronoun together; and |v,p|=number of times the system has seen both the verb and the pronoun together.

For the selection directive in the utterance, "Select this and move it there", Equation (1) becomes:

$$p_{accept} = \frac{p_{select} + p_{this} + \frac{|select, this|}{2} p_{select,this}}{2 + \frac{|select, this|}{2}} \quad (2)$$

Equation (2) is also used to estimate the probability of acceptance for the move directive, but under the assumption that there is a currently selected object and the user is pointing at a viable target. The probability of acceptance for the move directive of the utterance "Select this and move it there" has a slight subtlety but becomes:

$$p_{accept} = \frac{p_{move} + p_{it}\frac{|move, it|}{2}p_{move,it}}{2 + \frac{|move, it|}{2}} \quad (3)$$

In the case of this directive, there are two deictic terms, but the system stops processing as soon as the first of the deictic terms are transcribed. If the word "it" were mistranscribed to a non-deictic, the term "there" would be used instead.

Equation (1) is a weighted average of the three probabilities, $p_v$, $p_p$ and $p_{v,p}$ where the weighting heavily favors $p_{v,p}$ once sufficiently many instances of the associated {verb, pronoun} pair have been seen. If the system is wrong and the item is mistakenly selected, the user can do one of several things to tell the system that its reaction was incorrect. The user can say, "no, not that," or in fact any short utterance containing either the word "no" or the word "not." In this case the selected item is deselected. Secondly, the user can select something else. Finally, the user can do nothing with the selection and in 30 seconds the selection indicator will disappear.

In any of these cases of rejection, the associated probabilities of $p_v$, $p_p$ and $p_{v,p}$ go down, while the value of |v,p| is incremented by one. Non-rejection is assumed to be acceptance, in which case $p_v$, $p_p$ and $p_{v,p}$ all go up, and, just like in the case of rejection, the value of |v,p| is incremented by one. The values $p_v$, $p_p$ and $p_{v,p}$ are actually maintained as pairs of integers. For example, $p_v$ is maintained as a running fraction of the number of times a selection directive containing the given verb has been accepted (i.e., not rejected), over the total number of times a selection directive containing the given verb has been selected (i.e., either accepted or rejected).

In this embodiment the system only learns from false and true positives. The user may get irritated in the case of a false negative, in other words, the case that a user intended to select something but the system did not pick up on this fact, but in the present embodiment the system is not instrumented to pick up on such user frustration. Since the system cannot learn anything from false negatives, if $p_{accept} >= 0.5$ the system always opts to select. On the other hand, in an embodiment, if $p_{accept} <= 0.5$, the system adopts a modest bandit strategy, and draws a random number 0<q<1 and if $$q < (p_{accept})^{lg(2+\frac{|v,p|}{2})}, \quad (4)$$

where lg( ) is the base-2 logarithm function, then the system will opt to select, thereby trading off a certain amount of current reward for learning and, hence, expected future dividends. As more instances of the particular {verb, pronoun} pair accumulate, and hence |v,p| goes up, the less eager the system is to explore.

Undoing the move directive is handled similarly. Note, however, that it is quite frequently the case that the move directive does not contain a deictic, for example, "Move this there," "Move this over there," "put this there," and many other such examples. For this purpose the system uses a special $p_{v_\emptyset}$: that gives the probability of acceptance given that no verb was heard, $p_{v_\emptyset,p}$, giving the probability of acceptance of the utterance given the specified pronoun with no verb, and the analogous formula:

$$p_{accept} = \frac{p_{v_\emptyset} + p_p + \frac{|v_\emptyset, p|}{2}p_{v_\emptyset,p}}{2 + \frac{|v_\emptyset, p|}{2}} \quad (5)$$

Although the case where only a deictic is uttered is more common, there are also cases where only a verb is uttered and also where only one of these parts of speech are uttered because of errors in the speech to text transcription. Thus, there are cases where one needs to use a term $p_{p_\emptyset}$, analogous to $p_{v_\emptyset}$ given above.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
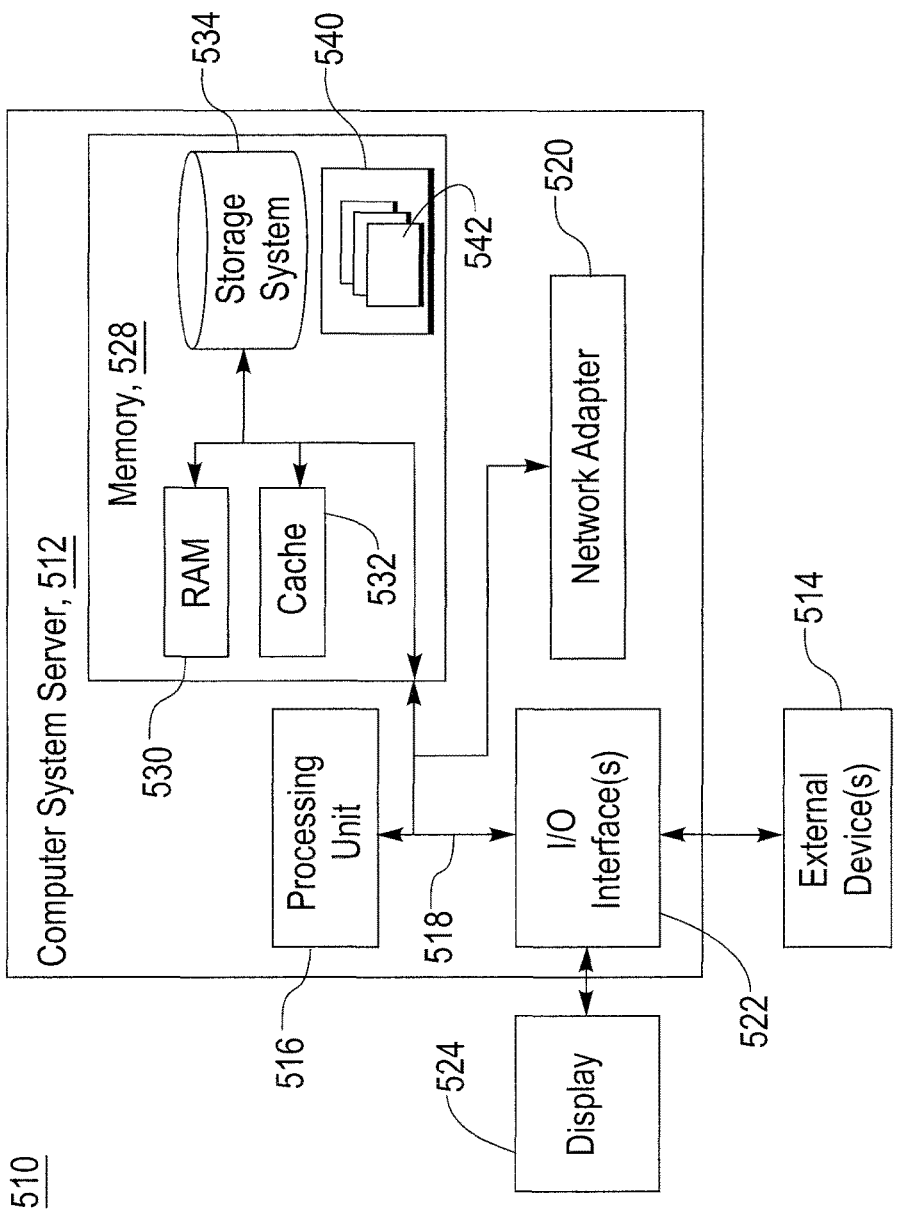
FIG. 5 shows an exemplary cloud computing node 510, in accordance with an embodiment of the present principles.

Referring now to FIG. 5, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
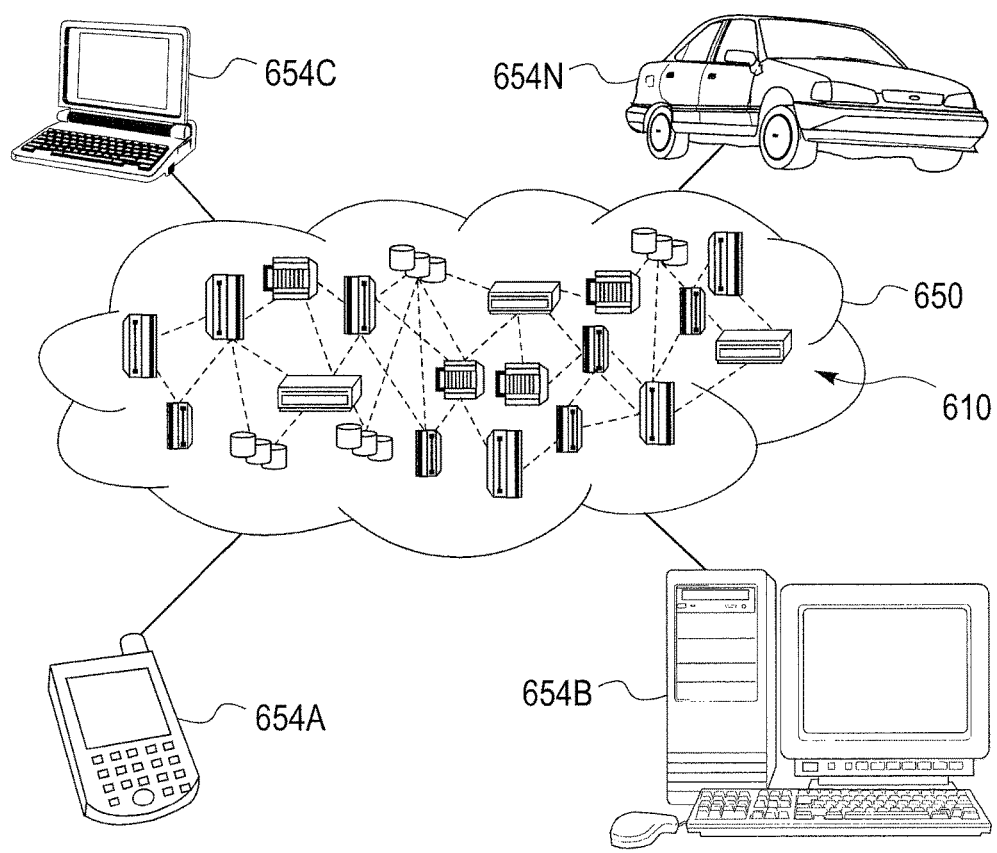
FIG. 6 shows an exemplary cloud computing environment 650, in accordance with an embodiment of the present principles.

Referring now to FIG. 6, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
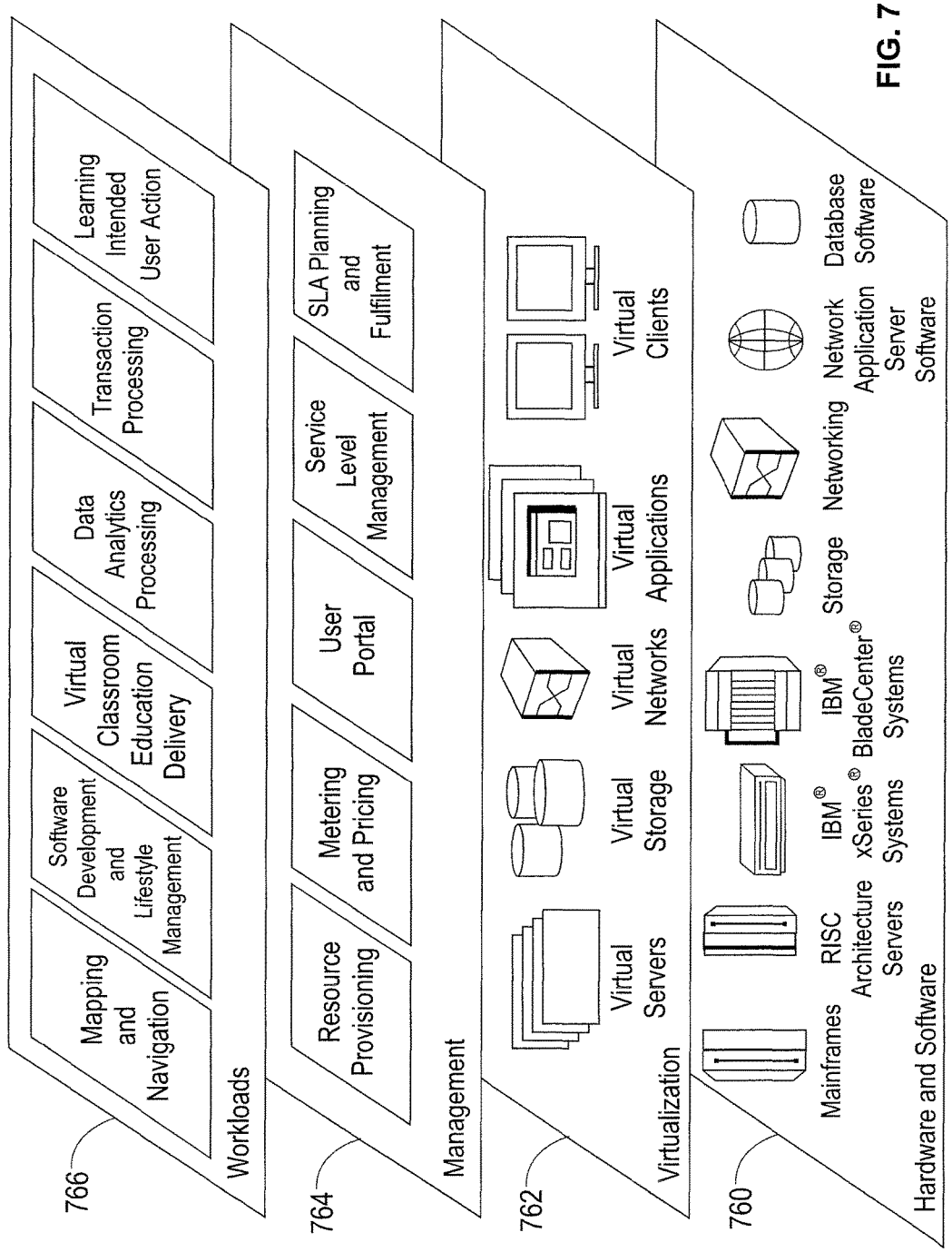
FIG. 7 shows exemplary abstraction model layers, in accordance with an embodiment of the present principles.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and enumerating and modifying cognitive interface elements in an ambient computing environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer program product for recognizing intended user actions, the computer program product comprising a computer readable storage medium having program instructions embodied therewith, the program instructions executable by a computer to cause the computer to perform a method comprising:

receiving, by a microphone and camera, user utterances indicative of user commands and associated user gestures for the user utterances;

parsing, by a hardware-based recognizer, sample utterances and the user utterances into verb parts and noun parts;

recognizing, by a hardware-based recognizer, the user utterances and the associated user gestures based on the sample utterances and descriptions of associated supporting gestures for the sample utterances, said recognizing step comprising sequentially comparing each of the verb parts and each of the noun parts from the user utterances both individually and as pairs to the verb parts and the noun parts of the sample utterances;

tracking words and word pairs used in conjunction with one or more recognized gestures, and determining a frequency of accepted and rejected system actions based on the tracking; and selectively performing a given one of the user commands responsive to a recognition result.

2. A system, comprising a microphone and camera for receiving user utterances indicative of user commands and associated user gestures for the user utterances;

a hardware-based recognizer for parsing sample utterances and the user utterances into verb parts and noun parts, and recognizing the user utterances and the associated user gestures based on the sample utterances and descriptions of associated supporting gestures for the sample utterance by sequentially comparing each of the verb parts and each of the noun parts from the user utterances both individually and as pairs to the verb parts and the noun parts of the sample utterances;

a statistical knowledge repository for tracking words and word pairs used in conjunction with one or more recognized gestures, and determining a frequency of accepted and rejected system actions based on the tracking; and a user command selective execution device for selectively performing a given one of the user commands responsive to a recognition result.

3. The system of claim 2, wherein the user speech and associated gesture recognizer forms triples of a verb, a noun, and a gesture, and sequentially compares the verb and the noun to the gesture as a pair and individually.

4. The system of claim 2, further comprising a user command learning device for learning from multiple recognition sessions by acquiring user accepted examples and user rejected examples of the user utterances and the associated user gestures, and wherein the user command selective execution device selectively performs a given one of the user commands responsive to the user accepted examples and the user rejected examples.

5. The system of claim 4, further comprising a confidence indication generator for generating respective confidence values for at least one of the noun, the verb, the gesture, and a combination thereof including at least the gesture, responsive to at least one of a number of positive examples and a number of negative examples involving the gesture and at least one of the noun and the verb for a particular one of the user commands.

6. The system of claim 4, further comprising an error indication generator for generating respective error values for at least one of the noun, the verb, the gesture, and a combination thereof including at least the gesture, responsive to at least one of a number of user accepted examples and a number of user rejected examples involving the gesture and at least one of the noun and the verb for a particular one of the user commands.

7. The computer program product of claim 1, wherein the method further comprises forming triples of a verb, a noun, and a gesture, and sequentially comparing the verb and the noun to the gesture as a pair and individually.

8. The computer program product of claim 1, wherein the method further comprises learning from multiple recognition sessions by acquiring user accepted examples and user rejected examples of the user utterances and the associated user gestures, and selectively performing a given one of the user commands responsive to the user accepted examples and the user rejected examples.

9. The computer program product of claim 8, wherein the method further comprises generating respective confidence values for at least one of the noun, the verb, the gesture, and a combination thereof including at least the gesture, responsive to at least one of a number of positive examples and a number of negative examples involving the gesture and at least one of the noun and the verb for a particular one of the user commands.

10. The computer program product of claim 8, wherein the method further comprises generating respective error values for at least one of the noun, the verb, the gesture, and a combination thereof including at least the gesture, responsive to at least one of a number of user accepted examples and a number of user rejected examples involving the gesture and at least one of the noun and the verb for a particular one of the user commands.

* * * * *